United States Patent [19]

Birchall et al.

[11] 3,793,105

[45] Feb. 19, 1974

[54] GLASS LAMINATES

[75] Inventors: James Derek Birchall, Norley; John Edward Cassidy, Hartford; John Edward Priddle, Welwyn; Laurence Michael Smith, Harpenden, all of England

[73] Assignee: Imperial Chemical Industries Limited, London, England

[22] Filed: Dec. 10, 1971

[21] Appl. No.: 211,856

[30] Foreign Application Priority Data
Dec. 11, 1970 Great Britain.................... 59029/70

[52] U.S. Cl............... 156/106, 161/191, 161/192, 161/199, 161/204, 117/54, 117/123 B
[51] Int. Cl...................... B32b 31/12, B32b 17/06
[58] Field of Search.... 117/54, 72 R, 123 A, 123 B; 156/99, 106; 161/41, 192, 199, 191

[56] References Cited
UNITED STATES PATENTS

| | | | |
|---|---|---|---|
| 3,556,890 | 1/1971 | Buckley et al. | 156/106 |
| 3,416,950 | 12/1968 | Schrader | 117/72 X |
| 2,702,068 | 2/1955 | Spooner | 117/72 X |
| 3,464,839 | 9/1969 | Gamble | 117/123 A |
| 2,290,193 | 7/1942 | Kirkpatrick | 161/199 X |
| 2,840,535 | 6/1958 | Crandon et al. | 117/123 D |
| 3,231,440 | 1/1966 | Mattimol et al. | 156/106 X |
| 3,388,033 | 6/1968 | Buckley et al. | 156/106 X |
| 2,885,417 | 5/1959 | Heyden | 117/127 |
| 3,023,337 | 2/1962 | Repsher | 117/68 X |

FOREIGN PATENTS OR APPLICATIONS
128,992   6/1960   U.S.S.R.

OTHER PUBLICATIONS

Matveev, M. A. and A. I. Rabukhin, "Glass–Reinforced Plastics", Chemical Abstracts, 31, 1090g (1961).

*Primary Examiner*—Charles E. Van Horn
*Attorney, Agent, or Firm*—Cushman, Darby & Cushman

[57] ABSTRACT

Glass laminates comprising two sheets of glass bonded together by a transparent plastics material have at least one of the bonded surfaces of the glass provided with a layer of aluminum phosphate. The aluminum phosphate is preferably generated from an alcoholic coating solution of a complex phosphate of aluminum, e.g., aluminum chlorophosphate ethanolate, which may be applied to the glass surface and cured by gentle heating.

9 Claims, No Drawings

GLASS LAMINATES

This invention relates to glass laminates.

In the term "glass" we include, as well as silicate glasses for which the term is conventionally used, transparent or translucent, substantially rigid sheet of plastics materials such as, for example, polymethylmethacrylate, polyvinylchloride, polystyrene or polycarbonate resin.

According to the present invention there is provided a method of making a glass laminate by bonding together two pieces of glass by means of a layer of substantially transparent plastics material characterised in that at least one of the glass surfaces to be bonded is pretreated by applying to the glass surface a coating of a composition capable of generating aluminum phosphate on heating and heating said coating to provide a cured or partially cured layer of aluminum phosphate.

The present invention is also a glass laminate comprising two sheets of glass bonded together by a substantially transparent plastics material, at least one of the bonded surfaces of the glass bearing a coating of an aluminum phosphate.

By the use of an aluminum phosphate in accordance with the invention, the adhesion of the glass surface to the plastics interlayer is increased. This effect may be used either to achieve a greater degree of adhesion of the interlayer to the glass than when untreated glass is used, or to allow the use of bonding techniques with less critical conditions to achieve a required degree of adhesion, so that these conditions may be chosen with greater freedom to obtain, for example, a higher transparency or clarity in the resulting laminate.

The composition capable of generating aluminum phosphate on heating can advantageously be a halogen-containing complex phosphate of aluminum containing at least one chemically-bound molecule of a hydroxy compound R-OH, where in R is a hydrogen atom or an organic group. Such materials are described and claimed in U. S. Pat. application Ser. No. 42,499, filed June 1, 1970, now refiled as application Ser. No. 274,964 filed July 25, 1972, the disclosure of which is incorporated herein by reference.

On heating these complex phosphates at relatively low temperatures, of the order of 80°–180° C, they decompose, evolving a hydrogen halide and the compound R-OH, to form a hard, abrasion-resistant aluminum phosphate. As used herein, the term "complex aluminum phosphate" denotes the material before decomposition by heating, while the term "aluminum phosphate" denotes the product obtained by decomposing the complex aluminum phosphate by heating.

The halogen in the complex aluminum phosphate is preferably chlorine. The ratio of the number of gram atoms of aluminum to the number of gram atoms of phosphorus in the complex phosphates of aluminum may vary over a wide range, for example from 1:2 to 2:1, but is preferably substantially 1:1 as complex phosphates of the invention having this ratio decompose at low temperatures directly to form aluminum orthophosphate having greater chemical stability and refractoriness than aluminum phosphate formed from complex phosphates with other ratios. It is also preferred that R is an aliphatic hydrocarbon or substituted hydrocarbon group; in particular it is preferred that the hydroxy compound is an aliphatic alcohol containing from one to four carbon atoms, particularly methanol or ethanol. As a typical example the complex aluminum phosphate has an empirical formula $AlPClH_{25}C_8O_8$; this can be designated aluminum chlorophosphate ethanolate, but it is to be understood that this designation in no way implies any particular molecular structure for the compound.

The complex aluminum phosphate may be applied to the glass surface as a solution in a suitable solvent, for example water or an alcohol such as methanol or ethanol. The aluminum phosphate produced by removing the solvent and heating to decompose the complex aluminum phosphate forms a strongly-adherent coating that is stable to high temperatures. Preferred organic solvents are polar solvents, especially oxygen-containing polar solvents. Aliphatic alcohols containing up to 10 carbon atoms, esters, polyhydric alcohols, and glycol esters are especially useful, aliphatic alcohols containing from one to five carbon atoms, for example methanol or ethanol, being particularly preferred. The solvent may be a mixture of solvents.

The solution of complex phosphate preferably contains, in solution or dispersion, a material that will control the physical nature of the solid phase of aluminum phosphate produced from the solution. When the solvent comprises water, it is preferred to use for this purpose a crystallisation stabiliser, for example, finely divided silica or alumina, or a nucleation activator or catalyst, for example dibutyl peroxide, or calcium, magnesium or sodium chloride. When the solution of the complex phosphate is non-aqueous, for example, when the solvent is ethanol, it is preferred to use a boric acid ester or ether or a silicic acid ester or ether, for example methylborate, trimethoxyboroxine or ethylsilicate, to suppress the crystallisation of aluminum phosphate.

In another method of preparing a suitable coating composition capable of yielding an aluminum phosphate on heating, aluminum phosphate is dissolved or dispersed in hydrochloric, sulphuric, oxalic or citric acid or a compatible mixture of two or more such acids. Aluminum orthophosphate, for example may be used with hydrochloric acid at molar ratios varying between 1:0.1 and 1:10, preferably between 1:0.25 and 1:10. Solutions obtained may optionally be diluted with water and/or an alcohol for example methanol or ethanol before use as a coating composition. It is preferred to dilute the solutions, if required, immediately before use because the dissolved phosphates are prone to precipitate from dilute solutions on prolonged storage.

A solution of aluminum phosphate in hydrochloric acid may be for the purposes of this invention made by dissolving aluminum chloride in phosphoric acid.

The coating may be applied to the glass surface by brushing, roller-coating, spraying, flowing, or by any other convenient method. The coating is cured by heating, which serves both to remove solvent, if present, and to generate a strongly adherent layer of aluminum phosphate on the surface. Heating of the phosphate coating is effected by any convenient means, for example by passing the coated glass through an air oven maintained at the required temperature. The duration of heating is preferably at least 10 minutes. The form of aluminum phosphate produced will depend, amongst other things, upon the temperature to which the coating is heated, and although a temperature of at least 80° C is normally sufficient to form a coat of aluminum phosphate, the coating is preferably heated to a temperature in excess of 100° C.

The thickness of the cured aluminum phosphate layer is preferably less than 10 microns, and when maximum transparency is required, is preferably less than 3 microns. Coatings of thickness greater than about 3 microns may however, be used where very high transparency is not important.

Organic materials, preferably polymers, may be dissolved in the solutions from which the coatings of this invention are produced to give coatings comprising an organic material and aluminum phosphate. It may be advantageous to add a suitable wetting agent to the coating solution to assist uniform coating. Other components, for example pigments, may be incorporated in the coating by including them in the coating solution.

Any of the transparent plastics materials known to be suitable for use in the production of laminated safety-glass may be used for bonding the glass laminate of the invention. Preferred materials are polyvinyl butyral and certain copolymers of ethylene, including those described in U.K. Specification No. 1,166,443. The latter are copolymers of ethylene with one or more hydroxy or epoxy aliphatic or cycloaliphatic monoesters or acrylic acid or methacrylic acid in which the aliphatic or cycloaliphatic radical consists only of carbon, hydrogen and oxygen and contains not more than six carbon atoms, and with from zero to 55 percent, by weight of the copolymer, of a further comonomer having one ethylenic double bond which is an ester of acrylic or methacrylic acid or a vinyl ester, the copolymer containing, by weight, at least 35 percent of ethylene units and:

a. from 2.0 to 8.5 percent of free hydroxy groups; or b. from 0.3 to 3.0 percent of epoxy oxygen; or
c. an equivalently effective amount with respect to the percentages stated in (a) and (b), of both free hydroxy groups and epoxy oxygen.

Other suitable ethylene copolymers include copolymers of ethylene with acrylic acid or methacrylic acid, and with a vinyl ester, an acrylate or a methacrylate as a third comonomer.

In a widely used process for the production of safety-glass, and suitable for making the laminates of this invention, the sheets of glass with the film interlayer interposed between them are assembled in a suitable jig, and the assembly is placed in a flexible bag of plastics or rubber. The bag is then thoroughly evacuated, and the assembly is placed in an oven, or, preferably, in an air or oil-autoclave, and heated to the desired bonding temperature. For the ethylene copolymers preferred for use in the method of the present invention, this is generally above 110° C, preferably between 110° and 170° C for a heating period of about 15 to 30 minutes; but higher temperatures and different time cycles may be used. The pressure of the atmosphere, when an oven is used, or the pressure applied in the autoclave, provides for uniform contact and bonding between the glass sheets and the interlayer. The assembly is then cooled or allowed to cool before its removal from the bag.

The laminates may alternatively be made by applying heat and pressure in a mechanical or hydraulic press, with heating and cooling applied by heat transfer through the platens. The bag and autoclave method is generally much preferred for making laminates of high quality, particularly for making curved laminates.

The invention is of particular value when applied to the modification of transparent safety-glass, especially that of the type used for windscreens for motor cars and other vehicles, comprising two sheets of silicate glass, which may be curved or flat, with a layer of transparent bonding medium sandwiched between them. Such safety-glass must be made to close tolerances, particularly as regards adhesion, transparency and clarity, and the manufacturing conditions are highly critical. Any widening of the range of choice of these conditions to obtain an optimum balance of properties is thus of value. It may also be used in the production of safety-glass for windows, screens or other constructional purposes.

The invention may also be usefully applied to the modification of safety-glass of the type comprising a sheet or sheets of silicate glass bonded to a sheet of a transparent or translucent, substantially rigid plastics material, or comprising two or more sheets of transparent or translucent, substantially rigid plastics material bonded together by the bonding medium. Such laminates are often used, for example for bandit-resistant and bullet-resistant glass windows for shops, show cases, banks, vehicles and the like. The substantially rigid plastics material used in such laminates is preferably an acrylic plastics material, especially polymethylmethacrylate, rigid polyvinylchloride, or a polycarbonate resin.

The invention is illustrated by the following Example in which all parts and percentages are by weight.

EXAMPLE

1/8 inch thick float-glass plates (1 ft × 1 ft) were stacked together in pairs and each pair immersed in a 10 percent by weight solution of aluminum chlorophosphate ethanolate in methanol contained in a polythene container (13 inch × 13 inch × 1½ inch) fitted with a lid and a drain tap. The plates were immersed for 2 minutes and dry nitrogen was passed into the container as the solution was slowly drained off. The plates were heated at 120° C for 30 minutes, allowed to cool and the inner (uncoated) face of each plate was cleaned with cleaned with dilute aqueous sodium hydroxide.

A laminate was made up consisting of two such plates having their coated faces innermost and an interlayer of .030 inch thick ethylene copolymer film containing 13 percent by weight methacrylic acid, 6 percent vinyl acetate, 5 percent methyl-methacrylate and 76 percent ethylene. This ethylene copolymer is disclosed in our co-pending Dutch Patent application No. 71/09975. The laminate was placed in a polyvinyl-chloride bag, which was sealed and evacuated. The bag with its contents was placed in an oven at 120° C. After 40 minutes at this temperature, the bag was removed and the laminate quench-cooled in water at 50° C.

Laminates made according to the above process were tested for impact performance, optical properties and environmental resistance by the methods of British Standard Specification 857 (equivalent to American Standards Association Specification Z26). The laminate conformed satisfactorily to the specified requirements of the standard.

We claim:

1. A method of making a glass laminate by bonding together two pieces of glass by means of a layer of substantially transparent plastics material characterised in that at least one of the glass surfaces to be bonded is pretreated by applying to the glass surface a coating of a composition comprising a halogen-containing complex aluminum phosphate containing at least one chemically-bound molecule of a hydroxy compound ROH wherein R is a hydrogen atom or an aliphatic hydrocarbon group, and heating said coating to at least 80° C to provide a cured or partially cured layer of aluminum phosphate.

2. A method as claimed in claim 1 wherein the hydroxy compound in the halogen-containing complex aluminum phosphate is an aliphatic alcohol containing one to 10 carbon atoms.

3. A method as claimed in claim 2 wherein the hydroxy compound is ethanol.

4. A method as claimed in claim 1 wherein the complex aluminum phosphate contains chlorine.

5. A method as claimed in claim 1 wherein the complex aluminum phosphate has the empirical formula $AlPClH_{25}C_8O_8$.

6. A method as claimed in claim 1 wherein the coating composition comprises the halogen-containing complex dissolved in an organic solvent.

7. A method as claimed in claim 6 wherein the solvent is methanol.

8. A method as claimed in claim 1 wherein the coating composition comprises the complex aluminum phosphate solution.

9. A process as claimed in claim 8 wherein the coating composition comprises an aqueous alcoholic solution of the complex of aluminum in HCl.

* * * * *